(12) United States Patent
Pang (10) Patent No.: US 7,047,495 B1
(45) Date of Patent: May 16, 2006

(54) METHOD AND APPARATUS FOR GRAPHICAL DEVICE MANAGEMENT USING A VIRTUAL CONSOLE

(75) Inventor: Dayman Pang, North York (CA)

(73) Assignee: Intel Corporation, Santa Clara, CA (US)

( * ) Notice: Subject to any disclaimer, the term of this patent is extended or adjusted under 35 U.S.C. 154(b) by 255 days.

(21) Appl. No.: 09/607,592

(22) Filed: Jun. 30, 2000

(51) Int. Cl.
*G06F 3/00* (2006.01)
*G06F 9/00* (2006.01)
*G06F 17/00* (2006.01)

(52) U.S. Cl. ..................................... 715/736; 715/762
(58) Field of Classification Search ................ 345/734, 345/735, 740, 746, 762, 763, 771; 700/17, 700/20; 709/223, 220, 221, 222; 717/171, 717/106, 134, 135, 136, 137, 138, 139; 715/736
See application file for complete search history.

(56) References Cited

U.S. PATENT DOCUMENTS

| 5,999,179 | A | * | 12/1999 | Kekic et al. ................ 345/734 |
| 6,041,350 | A | * | 3/2000 | Takimoto .................... 709/223 |
| 6,046,742 | A | * | 4/2000 | Chari ......................... 345/734 |
| 6,138,154 | A | * | 10/2000 | Karino ........................ 709/223 |
| 6,286,003 | B1 | * | 9/2001 | Muta ............................ 707/10 |
| 6,363,421 | B1 | * | 3/2002 | Barker et al. ................ 709/223 |
| 6,434,447 | B1 | * | 8/2002 | Shteyn ........................ 700/245 |
| 6,456,892 | B1 | * | 9/2002 | Dara-Abrams et al. ....... 700/83 |

FOREIGN PATENT DOCUMENTS

| EP | 0 295 760 A2 | 12/1988 |
| EP | 0 513 553 A2 | 11/1992 |
| WO | WO 96/14618 | 5/1996 |

OTHER PUBLICATIONS

"Shiva Virtual Private Networking Concepts Guide;" Shiva Corpoartion; Dec. 1998; Bedford, Massachusetts.

* cited by examiner

*Primary Examiner*—Tadesse Hailu
*Assistant Examiner*—Blaine Basom
(74) *Attorney, Agent, or Firm*—Blakely, Sokoloff, Taylor & Zafman LLP

(57) ABSTRACT

A method and apparatus is provided for remote device management using a virtual console. The method and apparatus implements a normalized scheme for developing a graphical user interface (GUI) for remotely managing any computer or networking device that has a console user interface (CUI) for updating a device configuration using a set of predefined configuration commands, and an underlying configuration kernel (CK) for maintaining the state of the device configuration (e.g. user names, passwords, timeout values, etc.). By re-using the CUI and underlying CK code, the scheme requires minimal specific knowledge of the configuration command set implementing the CUI and CK configuration functionality, thereby eliminating the necessity for creating redundant command set aware code in the GUI. In one embodiment, the method and apparatus employs a set of object-oriented classes and macros which interact with the CUI in a standardized manner to associate GUI components with the corresponding configuration command set. The standardized manner of interacting includes refreshing the state of the GUI in response to messages sent from the CUI, and sending messages to the CUI in response to user actions in the GUI. As a result, the GUI functions as a user-friendly interface that encapsulates the functionality of the CUI and underlying CK, and the CUI functions as a virtual console for the remote device.

20 Claims, 5 Drawing Sheets

Relationship between GUI, CUI and CK

Device management process

Refreshing the GUI

METHOD AND APPARATUS FOR GRAPHICAL DEVICE MANAGEMENT USING A VIRTUAL CONSOLE

BACKGROUND OF THE INVENTION

1. Field of the Invention

The present invention relates generally to software for developing graphical device management applications for managing remote devices. More specifically, the present invention relates to technology that enables the rapid development of graphical user interfaces for remote devices through the use of a virtual console.

2. Background Information

As computer networks continue to grow at a rapid pace, it is not uncommon for the networks to span organizational and geographical boundaries forming enterprise networks. Many of the enterprise network and computer devices upon which the network relies, such as switches, routers, bridges, hubs, and gateways, must often be remotely configured in order to effectively manage the network.

The present generation of many networking and computing devices supports both local and remote methods of configuration. For example, the use of a locally connected terminal to configure a device using a console user interface (CUI) to the device's serial console is very common. At the same time the use of a remotely connected workstation with a graphical user interface (GUI) to configure the same device is also an expected device management product feature. Though running on different platforms, both the CUI and GUI must use the same predefined command set to update the configuration file. Regardless of the method used, the ultimate purpose is to refresh the state of the remote device's configuration kernel (CK) by means of a configuration file. The CK includes all the variables, data structures and functions whose purpose is to maintain the state of the configuration of the device (e.g. user names, passwords, timeout values, etc.). The configuration file is an ASCII flat file that contains configuration commands used to refresh the CK.

One issue for programmers developing and maintaining device management application software is the redundancy and duplication of effort needed to maintain and support both the local and remote methods of device configuration. To a certain degree the remote GUI developer must code the same intelligence for providing configuration functionality as does the local CUI developer. Although the CUI and GUI user interfaces will differ, the underlying requirements of the command set necessary to update the configuration file will be the same. Consequently, the GUI developer ends up having to maintain command set aware source code that duplicates the functions of the CUI firmware implemented in the remote device's serial console.

One solution to eliminating the redundancy would be to port the CUI to the remote platform used to remotely manage and configure devices. However, the CUI is often implemented in firmware that cannot easily run on a non-native platform such as that running a typical device management system GUI. For example, not all variables required for the operation of the console firmware are able to be resolved in a non-native remote platform. Consequently, most software developers employ a brute force approach in the development of GUI applications for remote device management.

Figure 1:
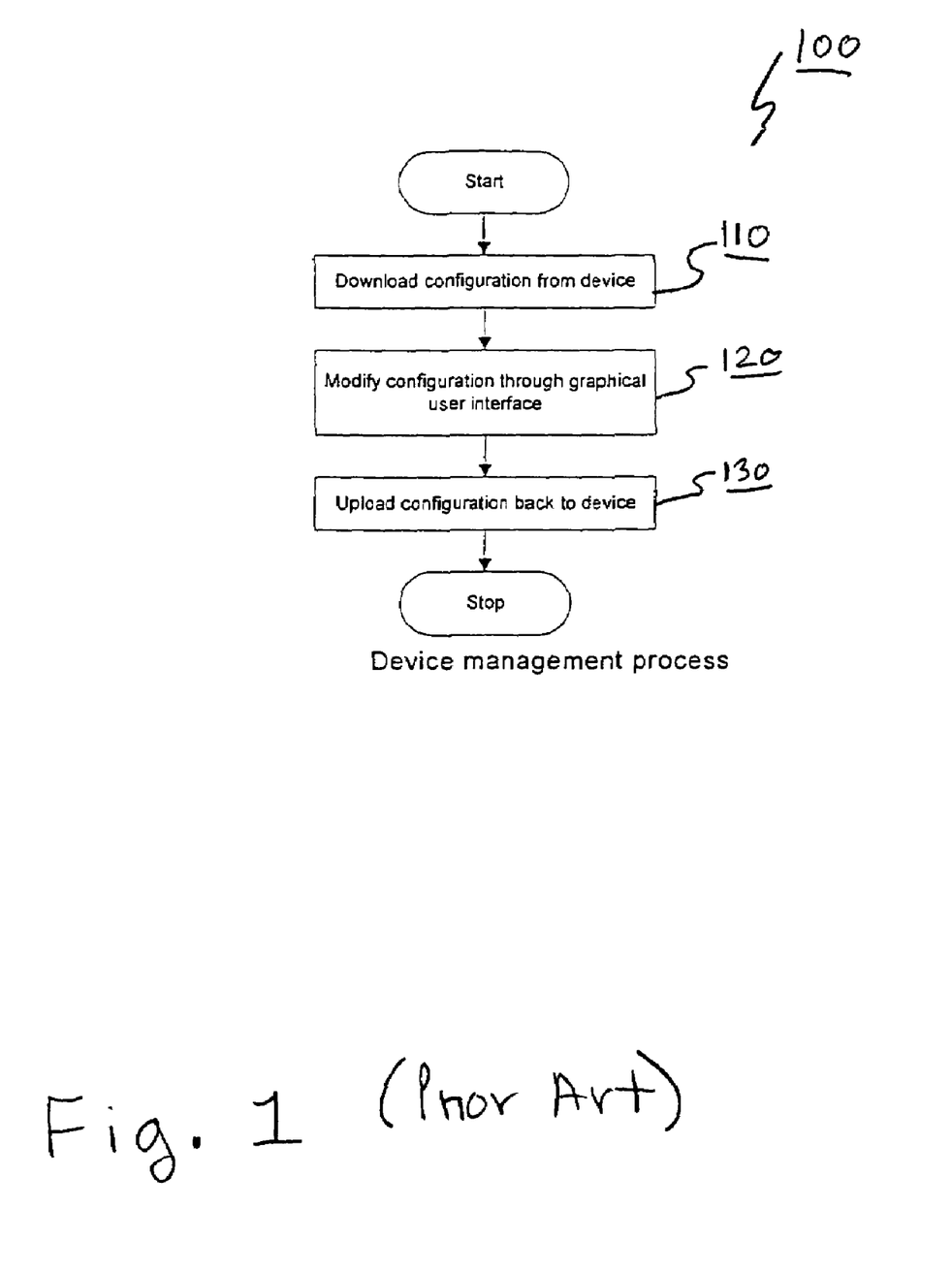
FIG. 1 illustrates a block diagram of the prior art device management process.

The brute force approach such as that used by previous versions of the Shiva Virtual Private Networking (VPN) Manager, one component of a suite of graphical network management applications from Intel Corporation, the assignee of the present invention, is illustrated in FIG. 1. First, the configuration file is downloaded from the remote device 110 of process 100 into the GUI application. Then, the user modifies the configuration file using the GUI application 120. Finally, the process is reversed by uploading the modified configuration file back to the remote device 130. The modified configuration file then refreshes the state of the CK with configuration changes that reflect the user modifications.

This approach has several drawbacks, not the least of which is the requirement of associating each command parsed from the configuration file with the appropriate graphical component of the GUI application. The number of different graphical components that can be employed in a typical GUI application is enormous. A significant amount of intelligence must be coded in the GUI to associate all the configuration commands parsed from the downloaded configuration file with their corresponding graphical components. Typically, an elaborate routine is required to populate the graphical components based on the downloaded and parsed configuration commands, and a similarly elaborate routine is required to reconstruct the configuration commands for upload based on the graphical components' contents. Intricate validation mechanisms must be employed to ensure that the commands uploaded back to the remote device contain no illegal parameters. Moreover, it is likely that interdependencies between certain commands would further complicate the validation mechanisms.

In order to keep up with the rapid pace of remote computer and networking device management technology, it is clear that new approach for developing graphical device management applications is needed. An approach that facilitates the rapid development and maintenance of GUI applications for remote device management is therefore desirable, not only to eliminate the redundancy currently involved in maintaining multiple methods of updating device configurations, but also to reduce the complexity. One approach is the integration of the CUI and GUI interfaces in a user-friendly way—an approach that presents a unique set of challenges, requiring a new and novel solution.

SUMMARY

According to one aspect of the invention, a method for developing a graphical device management application is provided for creating a graphical component using a graphical programming language and associating the graphical component with a device configuration command. The method further provides for linking the associated graphical component with a console user interface (CUI) and a configuration kernel (CK). Both the CUI and CK have code for configuring a remote device according the device configuration command. Finally, the method provides for building a graphical user interface (GUI) from the linked graphical component, the CUI and the CK.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description various aspects of the present invention, a method and apparatus for graphical device management using a virtual console (hereinafter "GDMVC"), will be described. Specific details will be set forth in order to provide a thorough understanding of the present invention. However, it will be apparent to those skilled in the art that the present invention may be practiced with only some or all of the described aspects of the present invention, and with or without some or all of the specific details. In some instances, well known features may be omitted or simplified in order not to obscure the present invention.

Various operations will be described as multiple discrete steps performed in turn in a manner that is most helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

Figure 2:
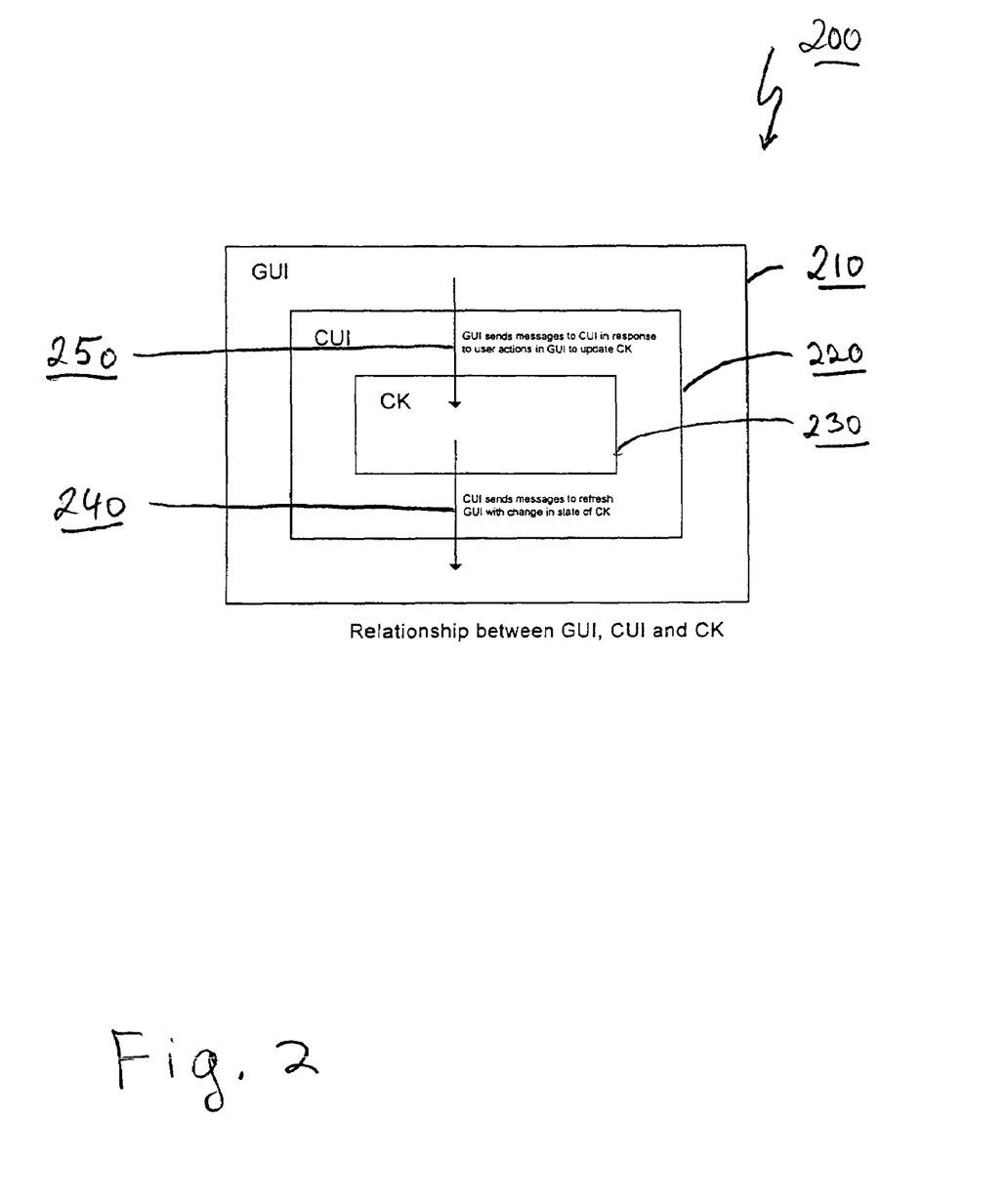
FIG. 2 illustrates a block diagram of the relationship of the GUI, CUI, and CK of the present invention in accordance with one embodiment.

Referring now to FIG. 2, wherein an block diagram illustrating the relationship of the GUI, CUI, and CK of the GDMVC method and apparatus in accordance with one embodiment is shown. As illustrated, the GUI 210 and CUI 220 form a self-contained application 200, with the CUI 220 running under the GUI 210. Since the CUI 220 is not running on an actual remote device, as in the prior art device management systems, it is referred to as a virtual console, hence the name of the present invention. The use of a virtual console avoids the difficulties inherent in attempting to interact directly with the remote device's CUI, such as latency problems (i.e. delays in refreshing the contents of the CK), and resource contention (i.e. when more than one user attempts to update the configuration at the same time, thereby creating a potential lockout situation).

Rather than recreating command set aware source code in the GUI 210 to handle each of the configuration commands as is done in the prior art "brute force" approach, the method and apparatus of the present invention re-uses the CUI firmware code and underlying CK. In one embodiment, the re-used CUI code is linked with the GUI code as a library. The interaction between the GUI 210 and the "virtual" CUI 220 (i.e. the CUI running the re-used CUI code and underlying CK) is performed in a standardized manner. In one embodiment the standardization of the interaction is implemented through the use of a set of object-oriented classes and macros.

With reference to FIG. 2, the standardized manner of interaction between the GUI 210, CUI 220, and CK 230 can be summarized as 1) refreshing the GUI 210 with any change in state of the CK 230 in response to messages sent from the CUI 220 (240); and 2) sending messages to the CUI 220 in response to user actions in the GUI 210 and updating the corresponding state of the CK 230 (250).

In operation, a file containing all of the console commands that define the device's configuration is downloaded and passed to the CUI 220 running under the GUI 210, thereby initializing the state of the CK 230. The user can then use the facilities of the GUI 210 to make modifications to the device configuration, during which the GUI 210 invokes the facilities of the re-used CUI code and the underlying CK 230. Once the modifications are complete, the device's configuration is uploaded back to the remote device to refresh the state of the remote device's CK 230.

An advantage to implementing the GUI 210 as encapsulating the CUI 220 as a virtual console is that the coding necessary to associate configuration commands with the GUI's graphical components is substantially reduced and does not require detailed intelligence about the configuration command set's behavior. A typical GUI application might employ a combination of tree views, list views and various dialogs to represent a configuration device. For example, a command in the configuration file might be:

Hostname MyHost

The Hostname command might be directly associated with an edit control in dialog, e.g. a dialog implemented in Visual Basic or other graphical programming language.

Using the prior art brute force approach requires that command set aware GUI code must be written to parse the command from the downloaded configuration file and then to populate the edit control with the text MyHost. The user could change the contents of the edit control, which would then be written with the hostname command to a updated configuration file by the GUI application. This process must be repeated for each individual configuration command and associated graphical component. Eventually, after completing all the changes, the updated configuration file would be uploaded back to the remote device, which in turn refreshes the state of the remote device's CK.

Using the facilities of the present invention in one embodiment, implementing the association between the hostname command and the corresponding edit control is accomplished much more efficiently than the brute force approach using the following macro:

ASSOCIATE_COMMAND (CCmdEdit, hostname)

In the macro, the first parameter is the class of the instantiated object bound to the edit control. The second parameter is the command keyword. Commands associated with other types of controls would require other control classes to be instantiated. For example, the class for a checkbox control might be CcmdCheck. For each command, a similar line of code is all that is needed to associate the command with its corresponding control.

The use of the macro provides one example of a tool for interacting between the GUI 210 and CUI 220 in a standardized manner. Implicit in the macro usage is that the configuration commands used by the remote CUI are already in a standard format, typically a keyword followed by one or more parameters.

Once the GUI 210 communicates to the CUI 220 the contents of the command, then the CUI 220 updates the CK 230 and reconstructs the configuration file from the state of the CK 230. If the command sent by the GUI 210 to the CUI 220 is invalid, an error message is sent back to the GUI 210 for display to the user.

In one embodiment, the interaction between the GUI 210 and CUI 220 is implemented in the CUI 220 with a function having an interface similar to that of the following C prototype:

BOOL SendCommand(const char* lpszcmd, char* lpszMsg, int nMsg);

where lpszcmd is a pointer to the command string passed to the CUI 220;

lpszMsg is a pointer to a buffer containing any reply text from the CUI 220, and nMsg is the size of the buffer pointed bo by lpszMsg.

The following paragraphs describe the interaction between the GUI 210 and the CUI 220 in a standardized manner in further detail.

Figure 3:
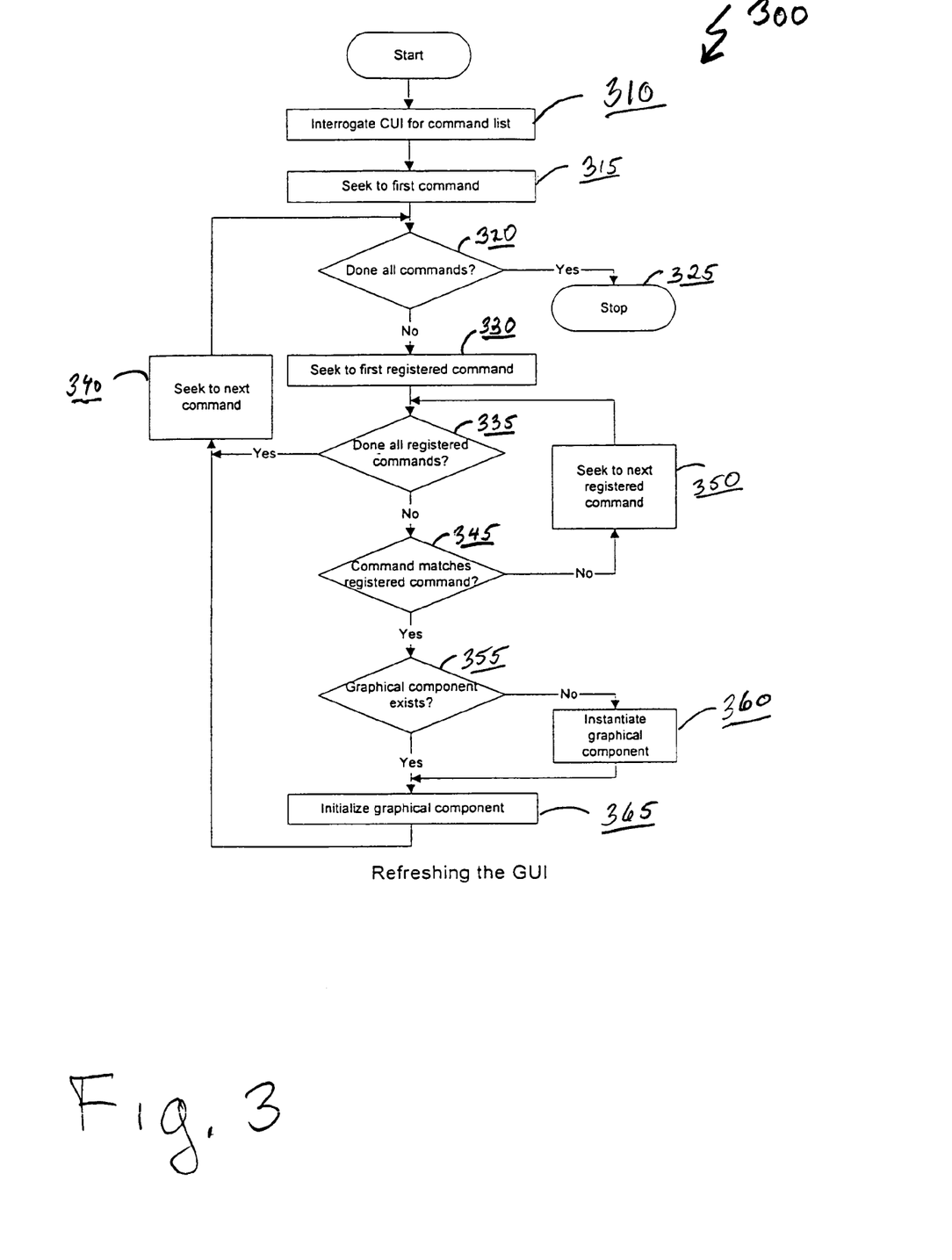
FIG. 3 illustrates a block diagram of refreshing the state of the GUI in response to messages sent from the CUI in accordance with one embodiment of the present invention.

Referring now to FIG. 3, wherein a block diagram illustrating the standardized manner of refreshing the GUI 210 to reflect the state of the CK 230 as communicated by the CUI 220 is shown in accordance with one embodiment of the present invention. The standardized manner of refreshing the GUI 210 is employed whether the GUI 210 is being initialized following a download of a device's configuration, or whether the GUI 210 is being refreshed after the user has caused changes in the CK 230. The process involves interrogation 310 of the CUI 220 for a list of all of the device's configuration commands (i.e. the commands that describe the state of the CK), enumerating all of the commands in the list, and instantiating 360 and initializing 365 a graphical component for each command by comparing each command in the list to a comprehensive register of commands that identifies each command's associated graphical component.

As shown, in one embodiment the latter two steps are accomplished by looping through the command list one at a time until the end of the list is reached. Specifically, the process involves seeking to the first command in the list 315, and if the end of the list has not yet been reached 320, then seeking again to the first registered command 330, and if the end of the list of registered commands has not yet been reached 335, then determining whether the command matches the registered command. If the command does not match the registered command, the process is repeated by seeking to the next registered command 350. Once a matching registered command is found 345 the associated graphical component is identified 355. If an instance of the associated graphical component does not yet exist, then one is first instantiated 360 and then initialized 365. Otherwise, the existing instance of the associated graphical component is simply initialized 365. This process is repeated by seeking to the next command in the list 340 until the list is exhausted 325. In another embodiment, an alternative method of comparing the list of commands to the command register is performed using a randomly accessible data repository for the comprehensive command register and associated graphical component and using a direct lookup by a command identifier, thereby eliminating the need for the looping logic.

The interrogation 310 is accomplished by sending a command to the CUI 220. As an example, in one embodiment the command could be show config This command is passed in the lpszcmd parameter to the SendCommand call prototype previously described. In return, the CUI 220 returns the list of commands in the lpszMsg parameter.

Initialization 365 of a graphical component for a command also involves interaction in a standardized manner between the GUI 210 and the CUI 220. In one embodiment, the interaction employs a common mechanism used by the CUI 220 to supply help text for a given command in the command set, i.e. passing the command to the CUI 220 followed by the "?" symbol. As an example, if the CCmdEdit class initialization code calls the SendCommand prototype previously described with the string "hostname ?" in the lpszCmd parameter, then the CUI 220 returns the text "<name> (Max length=8)" in the lpszMsg parameter. The initialization code then parses this information and sets the edit control to accept a maximum of 8 characters. Thus, an edit control with a spin button that accepts only numbers would be initialized with meaningful minimum and maximum values as provided in the associated command's help text. Of course, this method of initialization of a graphical component will only work for commands where the format of the returned text is itself standardized in the CUI 220, as in the case of the returned text of the help command.

Figure 4:
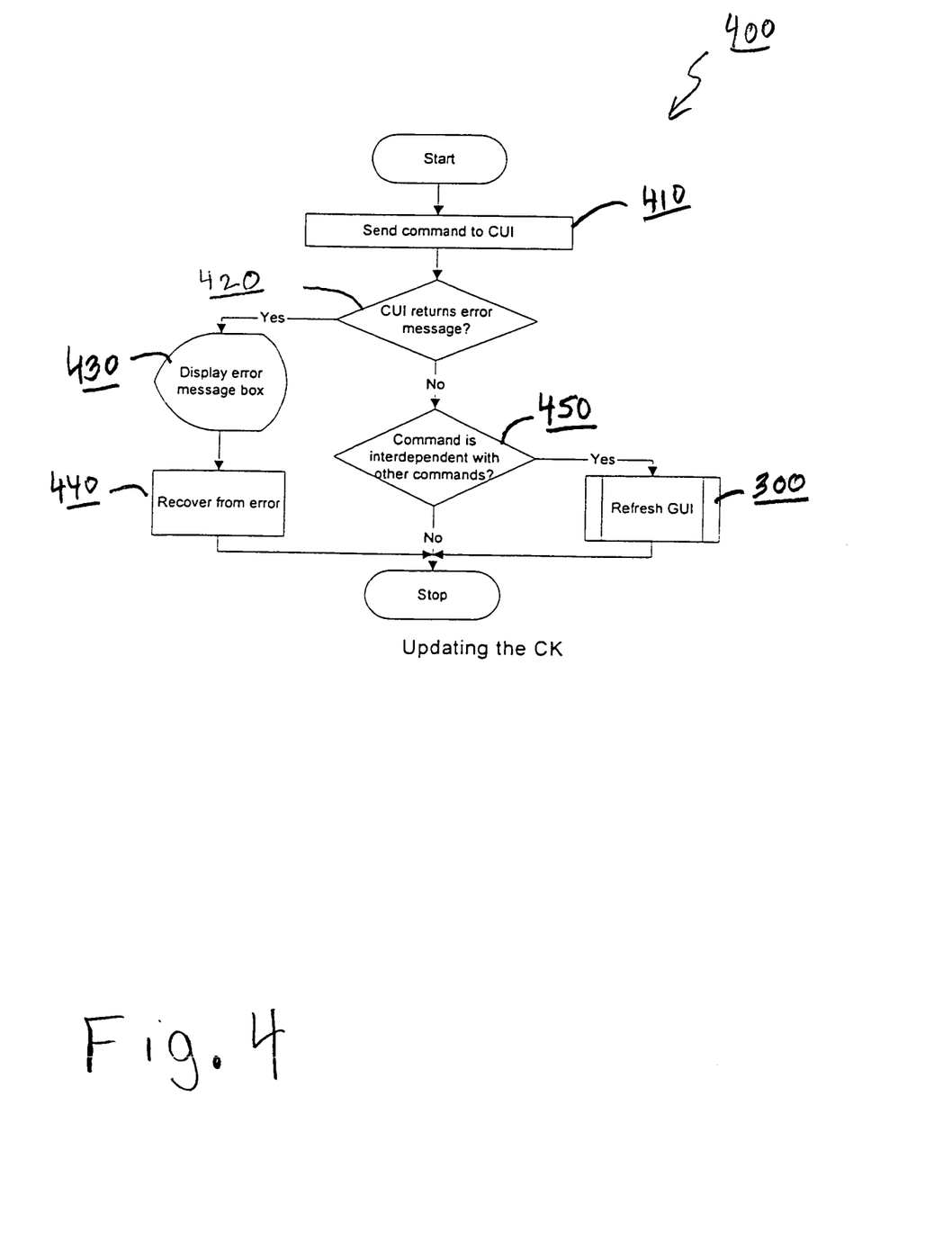
FIG. 4 illustrates a block diagram of sending messages to the CUI in response to user actions in the GUI in accordance with one embodiment of the present invention.

Referring now to FIG. 4, wherein a block diagram illustrating the standardized manner of sending messages to the CUI 220 to update the CK 230 in response to user actions in the GUI 210 is shown in accordance with one embodiment of the present invention. The standardized manner of updating the CK 230 is invoked when the user completes a modification of a given graphical component. This typically occurs when the user has finished typing in the new value in the graphical component (e.g. the edit control) which then loses the input focus (i.e. when the user selects another control from the display or leaves the dialog).

With reference to FIG. 4, the first step in process 400 is to send 410 the configuration command associated with the graphical component to the CUI 220. In one embodiment this is accomplished by sending the command string representing the command to the CUI 220 using the C prototype SendCommand and the lpszCmd pointer. If the CUI 220 replies with an error message, the text of that message is returned 420 to the GUI 210 using the lpszMSG pointer of SendCommand. The GUI 210 displays the error message to the user 430 and any graphical component-specific recovery from the error is performed 440. For example, in the case of a configuration command associated with an edit control graphical component, the GUI 210 sets the input focus back to that edit control so that the user can correct the error. If the CUI 220 detects no error, the CUI 220 next determines whether the configuration command sent by the GUI 210 is interdependent with any other configuration commands 450. If so, the GUI 210 is refreshed using the standardized manner of refreshing the GUI 300 described in FIG. 3 to reflect any changes in the CK 230 that may have resulted from the interdependencies.

The use of a virtual console to provide a remote graphical device management application not only reduces the redundancy inherent in the prior art by reusing the remote device's CUI and CK code, but also reduces the programmer's task in developing a GUI to one that is almost trivial. Using the method and apparatus of the present invention, all the programmer needs to do to add a new configuration command to the GUI is 1) add a control to a dialog template, using the facilities of the graphical programming language (e.g. Visual Basic), 2) create a macro to associate the control with the new command, and 3) rebuild the GUI application using the latest version of the reused CUI and CK code libraries.

This virtual console approach can be used in the development of remote management tools for any computer or networking device that has a console interface, and whose CUI and CK code can be extracted for re-use. Even for devices without a console interface, the virtual console approach might still be feasible if a CUI could be created to encapsulate the existing CK code.

Additional advantages to the virtual console approach to graphical device management includes the enforcement of consistency in the use of the remote device's command set, and the promotion of a normalized format for console help text. The close correspondence of the graphical components of the GUI with the console commands of the CUI provides a more standardized and user-friendly interface.

Figure 5:
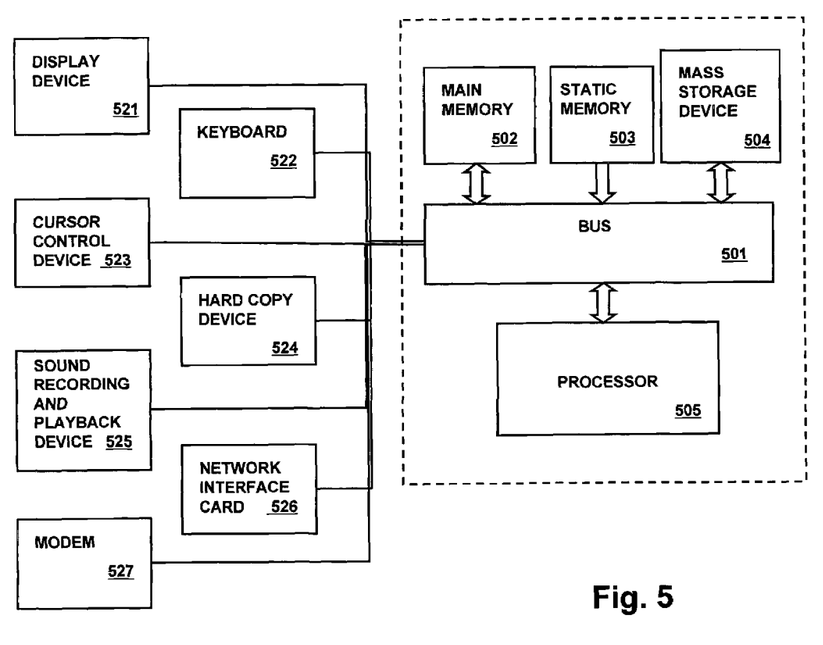
FIG. 5 illustrates a general-purpose computer system upon which an embodiment of the present invention may be implemented.

Referring now to FIG. 5, wherein a block diagram of a general-purpose computer system upon which an embodiment of the present invention may be implemented is shown. As illustrated, general-purpose computer system 500 comprises a bus 501, or other communications hardware and software, for communicating information, and a processor 502 coupled with bus 501 for processing information. Computer system 500 further comprises a random access memory (RAM) or other dynamic storage device 502 (referred to as main memory), coupled to bus 501 for storing information and instructions to be executed by processor 502. Computer system 500 also comprises a read only memory (ROM) 503, and/or other static storage device, coupled to bus 501 for storing static information and instructions for processor 502. Mass storage device 504 is coupled to bus 501 for storing information and instructions.

Furthermore, mass storage device 504, such as a magnetic disk or optical disk, and its corresponding disk drive, can be coupled to computer system 500. Computer system 500 can also be coupled via bus 501 to a display device 521 for displaying information to a computer user such as a network manager. Display device 521 is used to display windows containing the graphical user interface to the remote device management application. Display device 521 can include a frame buffer, specialized graphics rendering devices, a cathode ray tube (CRT), and/or flat pane display. An alphanumeric input device 522, including alphanumeric and other keys, is typically coupled to bus 501 for communicating information and command selections to processor 505. Another type of user input device is cursor control device 523, such as a mouse, a trackball, a pen, a touch screen, or cursor direction keys for communicating direction information and command selections to processor 505, and for controlling cursor movement on display device 521. This input device typically has two degrees of freedom in two axes, a first axis (e.g., the x-axis) and a second axis (e.g., the y-axis), which allows the device to specify positions in a plane. However, this invention should not be limited to input devices with only two degrees of freedom.

Another device that may be coupled to bus 501 is a hard copy device 524 which may be used for printing instructions, data, or other information on a medium such as paper, film, or similar types of media. Additionally, computer system 500 can be coupled to a device for sound recording, and/or playback 525, such as an audio digitizer coupled to a microphone for recording information. Further, the device may include a speaker that is coupled to a digital to analog (D/A) converter for playing back the digitized sounds.

Network interface card 526 is coupled to bus 501. Network interface card 526 is further coupled to an external computer network (not shown). Network interface card 526, in conjunction with appropriate data communications protocols (e.g., the TCP/IP suite of internetworking protocols), provide the means by which a graphical device management application operating on a general-purpose computer system 500 exchanges information with other devices coupled to the same computer network. Modem 527 is coupled to bus 501, and provides an alternate means of exchanging information with other devices for which a modem connection to an external computer network or device (not shown) can be established.

Computer system 500 and GDMVC application software stored and executed therein as part of the GDMVC method and apparatus operate in conjunction with an operating system with graphics capability, such as Microsoft's Windows operating system. Commercially available computer systems implementing the features of general-purpose computer system 500 include a broad range of operating system-based computers, including server computers, desktop computers, workstations, devices, or appliances. Furthermore, the present invention may be used in conjunction with various browser (e.g. Microsoft Internet Explorer or Netscape Navigator) and electronic mail applications (e.g. Microsoft Outlook, and Lotus Notes) or other messaging applications to yield an operational GDMVC platform upon which an embodiment of the present invention may be implemented.

Accordingly, a novel method and apparatus is described for a method and apparatus for graphical device management using a virtual console, so as to facilitate the rapid development of graphical user interfaces for remote device management. From the foregoing description, those skilled in the art will recognize that many other variations of the present invention are possible. In particular, while the present invention has been described as being implemented using particular types of object-oriented classes, macros, and prototypes different types of classes, macros or programming languages could be employed without departing from the principles of the present invention. In addition, some of the logic described in the processes illustrated in FIGS. 2, 3, and 4, may be distributed across various components of a general-purpose computer system 500 illustrated in FIG. 5 without departing from the principles of the present invention. Thus, the present invention is not limited by the details described. Instead, the present invention can be practiced with modifications and alterations within the spirit and scope of the appended claims.

The invention claimed is:

1. A method for developing a device management application to manage a remote device, comprising:
   providing a graphical programming language environment to develop source code for a command-set aware user interface, the source code to be used to generate a user interface to execute at the remote device to configure a configuration parameter of the remote device according to a configuration command of the command set;
   providing a graphical programming language environment to develop source code for a command-set unaware graphical user interface (GUI) of the device management application, the command-set unaware GUI to be executed remotely from the remote device;
   linking the source code for the command-set aware user interface in the source code for the command-set unaware GUI to provide a graphical component in the command-set unaware GUI associated with the configuration command; and
   building the source code for the command-set unaware GUI with the linked source code for the command-set aware user interface to result in the device management application having the command-set unaware GUI with the command-set aware user interface running beneath the GUI, both the GUI and the command-set aware user interface executing remotely from the remote device, with the GUI having the graphical component to provide access to the associated configuration command.

2. A method according to claim 1, wherein the command-set aware user interface comprises a user interface having code to execute every configuration command necessary to generate every configuration state of the remote device.

3. A method according to claim 1, wherein the configuration parameter comprises one or more of a variable, a data structure, or a function defining a configuration state of the remote device.

4. A method according to claim 1, wherein linking the source codes comprises providing a code hook in the source code for the GUI to the command-set aware user interface.

5. A method according to claim 1, wherein linking the source codes comprises providing the source code for the command-set aware user interface as a library referenced in the source code of the GUI.

6. A method according to claim 1, wherein linking the source codes comprises providing a macro of the programming language in the source code of the GUI.

7. A method according to claim 6, wherein providing the macro comprises referencing an object-oriented class object in the source code of the GUI, the class object to invoke a routine of the source code of the command-set aware user interface.

8. A method according to claim 1, wherein the source code for the command-set aware user interface comprises firmware defining the user interface, and wherein linking the source codes comprises re-using the firmware by linking the firmware to develop source code defining the device management application.

9. A method according to claim 1, wherein building the source code comprises compiling the source code for the command-set unaware GUI with the linked source code for the command-set-aware user interface to generate an executable binary device management application.

10. A method according to claim 1, further comprises:
    identifying an updated configuration command in the configuration command set at the remote device;
    updating the source code for the command-set aware user interface to reflect the updated configuration command in the configuration command set; and
    rebuilding the source code for the command-set unaware GUI with the linked updated source code for the command-set aware user interface to result in an updated device management application having a graphical component to provide access to the updated configuration command.

11. An article of manufacture comprising a computer-readable medium having instructions to cause a computer to perform operations including:
    receiving source code defining a console user interface (CUI) to generate a CUI to execute at a network device, the CUI to configure a configuration kernel (CK) of the network device according to a configuration command;
    receiving source code defining a graphical user interface (GUI) to generate a device management application, the GUI to be executed at a management point remote from the network device, the source code for the GUI to include a hook to the source code for the CUI to provide a graphical component in the GUI to operate a function of the CUI to access the configuration command from GUI; and
    building the source code for the GUI with the hook to the source code for the CUI to create the device management application having the CUI running under the GUI, both the GUI and the CUI running under the GUI executing remotely from the network device, the GUI having the graphical component to provide access to the associated configuration command.

12. An article of manufacture according to claim 11, wherein the source code for the GUI to include a hook to the source code for the CUI comprises the source code for the GUI to include a macro referencing the source code for the CUI.

13. An article of manufacture according to claim 11, wherein the operations further include providing the source code defining the CUI as a library to the source code defining the GUI, and wherein the source code for the GUI to include a hook to the source code for the CUI comprises the source code for the GUI to include a reference to a class defined in the library.

14. An article of manufacture according to claim 11, wherein the source code defining the CUI comprises firmware code defining the CUI, and wherein receiving the source code defining the CUI comprises re-using the firmware code to link the firmware code with the source code defining the GUI to develop the device management application.

15. An article of manufacture according to claim 11, wherein the operations further include:
    identifying an updated configuration command in the configuration command set at the network device;
    receiving updated source code defining the GUI to reflect the updated configuration command in the configuration command set; and
    rebuilding the source code for the GUI with the hook to the updated source code for the command-set aware user interface to result in an updated device management application having a graphical component to provide access to the updated configuration command.

16. An apparatus for managing a remote device, comprising:
    a memory having a management application, including:
        a graphical user interface (GUI) module having a graphical component associated with a configuration command, the graphical component responsive to a user input to operate the configuration command; and
        one or more code libraries including code defining a configuration kernel (CK) and code defining a console user interface (CUI) of a remote device, the CK having a configuration parameter associated with the configuration command, the configuration parameter corresponding to a resource of the remote device, the CUI to interface the configuration kernel with the GUI, the code libraries linked with the GUI and compiled with the GUI to create the management application having the GUI with the CK and the CUI running under the GUI, both the GUI and the CUI running under the GUI executing remotely from the remote device;
    a communications interface coupled with the remote device to communicate a configuration update for the remote device from the management application; and
    a processor coupled with the memory to operate the management application, and coupled with the communications interface to provide the configuration command to the communications interface.

17. An apparatus according to claim 16, wherein the GUI module further comprises a reference to a macro defined in one or more of the libraries.

18. An apparatus according to claim 16, wherein the GUI module further comprises a hook to a subroutine defined in one or more of the libraries.

19. An apparatus according to claim 16, wherein the code libraries including code defining the CK and defining the CUI comprises firmware code defining the CK and firmware code defining the CUI, the firmware code developed for execution on the remote device.

20. An apparatus according to claim 16, wherein the communications interface coupled with the remote device to further receive an updated configuration command from the network device, and the processor further to update the code libraries with the updated configuration command and to re-compile the updated code libraries with the GUI to create an updated management application.

* * * * *